June 16, 1925.
F. J. SCHROEDER
CUTTING TOOL
Filed Dec. 6, 1922
1,542,007
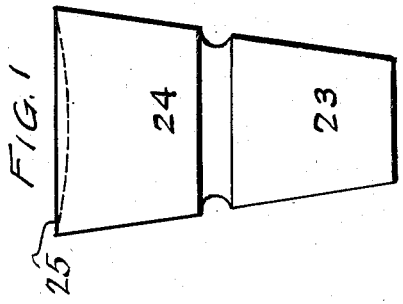
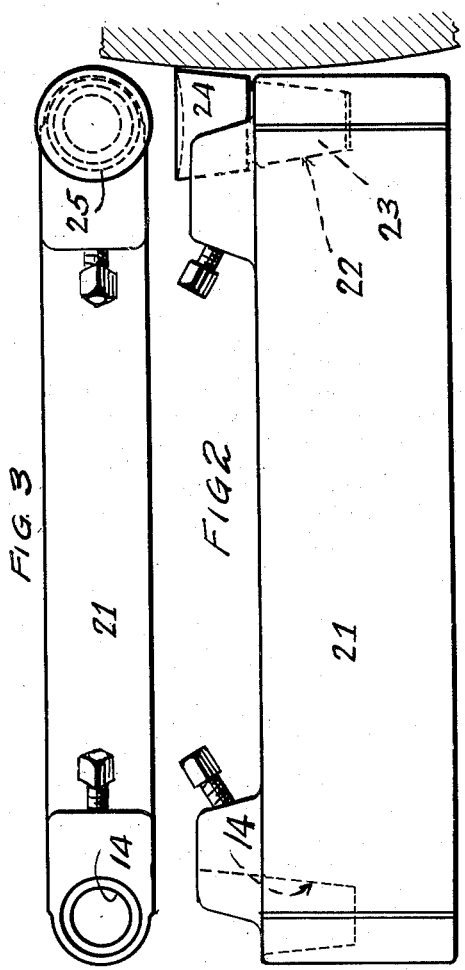
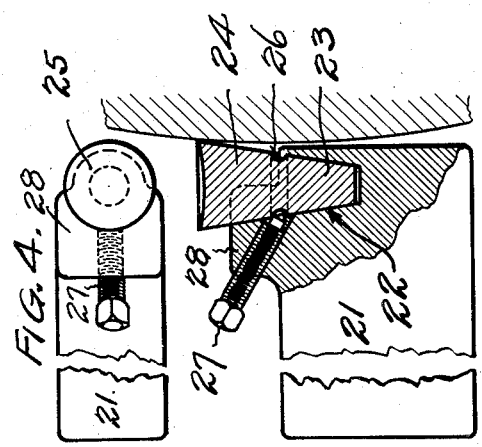
Inventor
FRANK J. SCHROEDER
By N.E. Gee
Attorney Patented June 16, 1925.

1,542,007

UNITED STATES PATENT OFFICE.

FRANK J. SCHROEDER, OF ALTOONA, PENNSYLVANIA.

CUTTING TOOL.

Application filed December 6, 1922. Serial No. 605,269.

*To all whom it may concern:*

Be it known that FRANK J. SCHROEDER, a citizen of the United States, residing at Altoona, in the county of Blair and State of Pennsylvania, has invented certain new and useful Improvements in Cutting Tools, of which the following is a specification.

This invention relates to metal cutting tools used on lathes, planers, boring machines and machines of a similar nature, and has for its primary object an improvement in the manufacture of the cutting tool and the tool holder used with the above machines.

Another object of this invention is to provide a metal cutting tool that is adapted to be revolved such as to bring a plurality of cutting edges against the object to be machined, thus saving the necessity of frequent grinding to keep the edge on the cutting tool.

A further object of this invention is to provide a cutting tool that is readily adjusted to the work and susceptible of being rigildly held in position when engaged with the work.

A further object of the invention is to provide a tool holder that readily receives the tool which is adapted to tighten in the holder as the work progresses, yet susceptible of being easily removed after the work is finished.

With these and many other objects in view which will be more readily apparent as the nature of the invention is better understood, the same consists in the novel construction, combination and arrangement of parts as will be hereinafter fully pointed out, illustrated and claimed.

It will be quite readily understood by those skilled in the art to which this invention belongs, that the present adaption can readily be modified to a considerable extent without departing from the spirit or scope of the invention, but a thoroughly practical embodiment of the invention is shown in the accompanying drawings in which:—

Figure 1 is an elevational view of my improved machine tool, showing the metal cutting head together with the shank which is made an integral part of the cutting head.

Figure 2 is an elevational view of the machine tool shown in Figure 1 together with the tool holder adapted to securely hold the tool when engaged by the work.

Figure 3 is a plan view of the parts shown in Figure 2 of the drawings and illustrates more clearly than is shown in Figure 1, the shape of the cutting edge of the improved machine tool.

Figure 4 is a top plan view illustrating a modification in the tool holder, this modification being necessary when the machine tool is used to turn locomotive or car wheel tires.

Figure 5 is a side elevation of the parts illustrated in Figure 4 of the drawings.

Similar reference numerals refer to similar parts throughout the several figures of the drawings.

In carrying out this invention I use high speed steel for the cutting tool, designated by the numeral 24. The cutting tool primarily consists of a cutting head and a tapered tool shank 23. The cutting head is likewise tapered in order to give the cutting edge the proper rake, while the top cylindrical surface is adapted to be ground concave as clearly shown in Figures 1, 2 and 5.

The cutting tool 24 being made circular in section, and ground concave as shown, thus presents a cutting edge equal to the circumference of the top of the cutting tool and each new position of the cutting tool, when revolved in the holder, presents a new cutting edge to the work, thus saving the necessity of bringing the machine to rest in order to regrind the cutting tool. The use of the improved tool thus obviously means a greater output for the shop as compared with the tools used at present, and the constant necessity of regrinding the same.

In order to hold the cutting tool in a firm immovable position the shank 23 is constructed with a taper which aproximates 15° on a side. This taper is sufficient to hold the tool in the tool holder when in operation, yet possesses the facility of being easily removed when the tool holder 21 is suddenly struck beneath the tool shank. The tool holder shown in Figure 2 is preferably made of axle steel, and is provided with two tool sockets. These sockets having the same taper as the shank of the tool, are made slightly deeper than the length of the shank thus allowing for the tool to draw into the socket when heavy work is being done.

This tool is particularly adapted to cut tires on car or locomotive wheels and the tool 21 is provided with a tapered socket 22 into which is adapted to fit the shank 23 of the high speed steel cutting tool 24 which has a cutting edge equal to the circumference of the top of the tool. The top 25 being ground concave as shown in Figure 1 of the drawings. The cutting tool 24 is provided with an annular groove 26, which is engaged by a set screw 27, which is necessary when this tool is used on planers and machines of a similar character. The tool holder 21 is constructed with an upstanding boss 28, which acts as an abutment for the cutting tool when heavy cuts are being taken.

The cutting tool in this installation is set above the centre of the wheel as shown in Figure 5 of the drawings.

Having thus described my invention, what I claim and desire to be secured by Letters Patent is—

A cutting tool comprising a holder provided at one end with a tapered tool receiving socket, an upstanding boss adjacent the socket, a cutting member having a tapered shank portion for fitting in the tapered socket, and a locking member projecting through the upstanding boss and engaging with the cutting member to lock the same in the socket.

In testimony whereof he affixes his signature.

FRANK J. SCHROEDER.